United States Patent
Shoemaker et al.

(10) Patent No.: US 7,976,621 B2
(45) Date of Patent: Jul. 12, 2011

(54) SYSTEM FOR RECOVERING WATER FROM FLUE GAS

(75) Inventors: Fred W. Shoemaker, Longwood, FL (US); Michael S. Briesch, Orlando, FL (US); Philip G. Deen, Enterprise, FL (US); Terrence B. Sullivan, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 12/714,721

(22) Filed: Mar. 1, 2010

(65) Prior Publication Data

US 2010/0146926 A1    Jun. 17, 2010

Related U.S. Application Data

(62) Division of application No. 11/345,724, filed on Feb. 2, 2006.

(51) Int. Cl.
*B01D 53/14* (2006.01)

(52) U.S. Cl. ............. 96/234; 95/36; 95/194; 95/205; 95/209; 95/227; 95/228; 95/231; 96/240; 96/242

(58) Field of Classification Search ............. 96/244, 96/234, 240, 242; 95/36, 194, 205, 209, 95/227, 228, 231

See application file for complete search history.

(56) References Cited

U.S. PATENT DOCUMENTS

| | | | |
|---|---|---|---|
| 3,651,617 A | 3/1972 | Hodgson |
| 5,020,335 A | 6/1991 | Albers et al. |
| 5,203,161 A | 4/1993 | Lehto |
| 5,346,592 A | 9/1994 | Madani |
| 6,050,083 A | 4/2000 | Meckler |
| 6,156,102 A | 12/2000 | Conrad et al. |
| 6,247,302 B1 | 6/2001 | Tsukamoto et al. |
| 6,461,413 B1 | 10/2002 | Landreau et al. |
| 6,511,525 B2 | 1/2003 | Spletzer et al. |
| 6,516,603 B1 | 2/2003 | Urbach et al. |
| 6,719,828 B1 | 4/2004 | Lovell et al. |
| 6,804,964 B2 | 10/2004 | Bellows et al. |
| 6,846,348 B2 | 1/2005 | Kitchener |

*Primary Examiner* — Duane Smith
*Assistant Examiner* — Tiffany N Palmer

(57) ABSTRACT

A power plant may include a combustion apparatus (11) producing an exhaust gas (12), an absorber (20) receiving the exhaust gas (12), the absorber (20) including a desiccant and producing a first stream of desiccant solution containing water and a first concentration of desiccant, and an apparatus (29, 70, 94) for dehydrating the first stream of desiccant solution while maintaining the water in a liquid phase. The apparatus (29, 70, 94) may include a heat exchanger (71, 110), a crystallizing heat exchanger (74, 96), a separator (78, 98) and a flash tank (112) for dehydrating the desiccant solution while maintaining water in a liquid phase and subsequently recovering water from the solution.

15 Claims, 3 Drawing Sheets

SYSTEM FOR RECOVERING WATER FROM FLUE GAS

This application is a divisional of, and claims priority to, co-pending U.S. patent application Ser. No. 11/345,724 filed on 2 Feb. 2006.

FIELD OF THE INVENTION

This invention relates generally to the field of recovering water from a flue gas and more particularly to recovering water from a flue gas produced by the combustion of a fossil fuel.

BACKGROUND OF THE INVENTION

Water is a natural byproduct of the combustion of hydrocarbon or fossil fuels. Permits for water are becoming increasingly difficult to obtain for power plants, which consume relatively large volumes of water during operation. In some cases, the difficulty with obtaining water permits for wells, or use of surface water may preclude construction of a needed power plant. Thus, recovering water from power plants is desirable to obviate the need of obtaining water permits.

Fossil fuel exhaust or flue gas, such as that exhausted from a combustion turbine engine, or downstream of a coal-fired boiler, can contain varying concentrations of water. Water concentration may depend on ambient conditions, fuel composition, inlet air treatment, fuel treatment, flue gas treatment and other factors. If the flue gas exhaust stream were cooled, a portion of that water could be recovered. It is known that cooling an exhaust stream in a condenser to below the precipitation temperature of the moisture in the exhaust gas will result in the condensation of a portion of that moisture. The quantity and percentage of recovered moisture depends on the temperature to which the exhaust can be cooled by the condenser.

Ambient air is commonly the ultimate heat sink for condensers, and the ambient air temperature thus determines the amount of moisture that can be removed by a condenser. In an arid desert environment, for example, the effectiveness of water removal by an ambient air-cooled condenser is limited. Given such high ambient temperatures and the limits of heat exchange equipment, direct condensation alone becomes technically untenable.

DETAILED DESCRIPTION OF THE INVENTION

Figure 1:
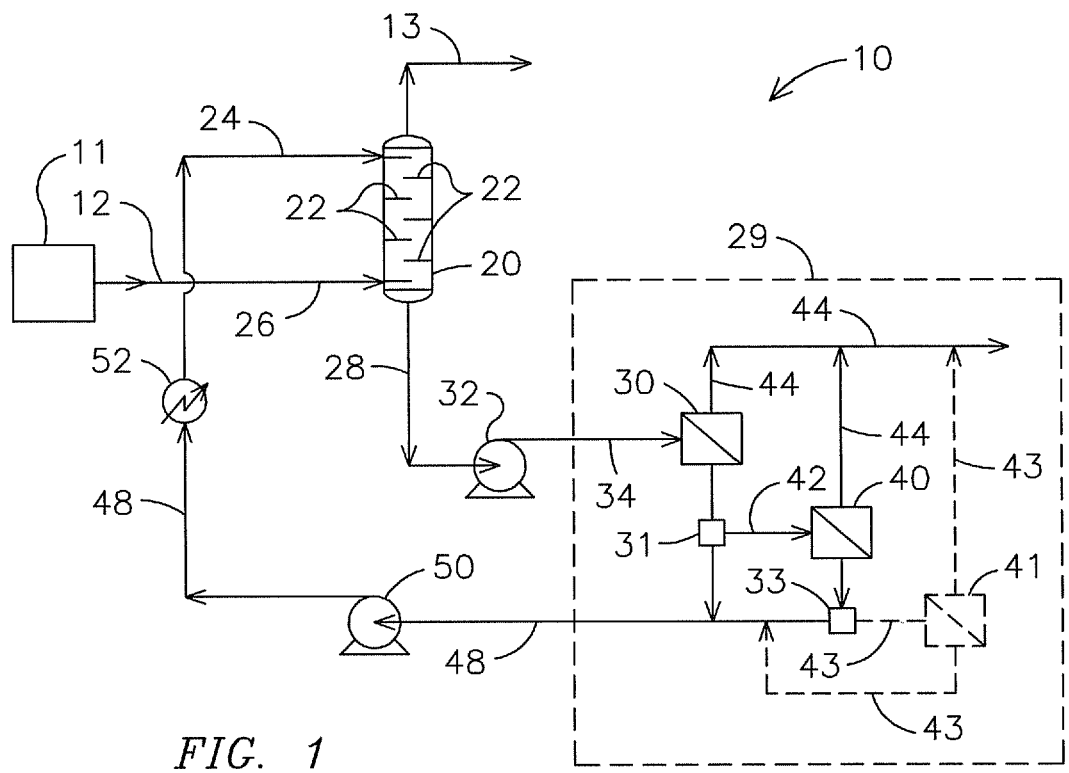
FIG. 1 is a schematic of an exemplary embodiment of a system for removing water from a flue gas and recovering water from a desiccant stream.

FIG. 1 is a schematic of an exemplary embodiment of a water recovery system 10 for recovering water from a flue or exhaust gas 12 and removing water from a desiccant stream. System 10 may be used to recover water from a flue gas produced using a fossil fuel to generate power such as a combustion turbine power plant. One such power plant is a Model SGT5-5000F sold by Siemens Power Corporation, the assignee of the present invention. It will be appreciated that embodiments of system 10 may be used with various types of plants combusting fossil fuels in a combustion apparatus or furnace such as coal-fired, oil-fired or biomass-fired plants. Examples of combustion turbine power plants are disclosed in U.S. Pat. No. 6,804,964, which is specifically incorporated herein by reference in its entirety. Embodiments of the present invention provide lower capital costs and improved water recovery rates compared to conventional water recovery systems such as those relying on large quantities of heat for evaporation.

Before flue gas 12 is released to the ambient atmosphere 13, it is first treated by system 10. FIG. 1 illustrates that flue gas 12 exiting a combustion apparatus 11 may be directed to a water stripper or absorber 20. Absorber 20 may define an interior portion or plenum containing a fill material or media 22. Media 22 may be a packed media based system using polyethylene, ceramic, metal or other suitable materials. Media 22 provides surface area contact between flue gas 12 and a flow of aqueous desiccant solution, for example, entering absorber 20 through inlet connection 24. Other desiccant solutions may be used comprising solvents and desiccant solutes recognized by those skilled in the art. Embodiments of system 10 may be adapted to use a solid form of desiccant, such as a desiccant wheel exposing the desiccant to flue gas 12 in absorber 20. Absorber 20 may be one disclosed in pending application having application Ser. No. 11/183,696 filed Jul. 18, 2005, which is specifically incorporated herein by reference in its entirety.

In an exemplary embodiment, flue gas 12 passes into absorber 20 through a flue gas inlet 26. Flue gas 12 may enter absorber 20 at approximately 200° F.-300° F., or hotter and contain approximately 5%-10% by volume of moisture, or more. It will be appreciated that the flue gas temperature and moisture content may vary as a function of ambient conditions, performance objectives of the fossil fuel combustor and other operating parameters of a fossil fuel burning plant. The desiccant solution may flow into absorber 20 through inlet connection 24. Water is chemically absorbed from flue gas 12 by the desiccant solution. The desiccant solution may contain various desiccant compounds such as calcium chloride ($CaCl_2$), bromide, lithium chloride, various hydroxides such as lithium hydroxide or sodium hydroxide, or organic liquids such as polypropylene glycol, or mixtures thereof, for example.

Moisture removal from flue gas 12 in absorber 20 is a highly exothermic process. This process causes the desiccant solution temperature, such as a $CaCl_2$ aqueous solution, for example, to increase and the concentration of $CaCl_2$ in the solution to decrease by weight. As the moisture content in the desiccant solution increases, moisture in flue gas 13 exhausting to atmosphere decreases. The temperature and concentration of $CaCl_2$ in the desiccant solution exiting absorber 20 depend on the relative quantity and inlet temperature of the $CaCl_2$ desiccant solution, and the moisture content and temperature of flue gas 12 entering absorber 20.

The desiccant solution may exit absorber 20 through outlet connection 28 and be pumped to a means for dehydrating the desiccant solution while maintaining the water in a liquid phase, such as reverse osmosis circuit 29. Reverse osmosis circuit 29 may include a primary or first reverse osmosis apparatus 30 comprising a membrane porous to water, but not to desiccant to separate at least a portion of water from desiccant. The flow of desiccant solution exiting absorber 20 may have no head pressure so pressurization pump 32 may be provided to increase the pressure to that required by primary reverse osmosis apparatus 30.

The heated flow of desiccant solution flowing into primary reverse osmosis apparatus 30 will have a lower concentration of $CaCl_2$ than that of the desiccant solution entering absorber 20 through inlet connection 24. This is due to the absorption of moisture into the desiccant solution in absorber 20. The concentration of desiccant within the desiccant solution within system 10 may be referred to herein in relativistic terms as being "weak" or "strong" but is not intended to imply specific concentrations.

Primary reverse osmosis apparatus 30 may be configured with internal modules containing membranes that allow water to pass there through while retaining desiccant materials at the molecular level. This may be accomplished when pressure is applied to the desiccant feed solution stream flowing through inlet fluid connection 34 by a high-pressure pump such as pump 32. In an exemplary embodiment, a secondary or second reverse osmosis apparatus 40 may be provided that operates in conjunction with primary reverse osmosis apparatus 30.

It will be appreciated that the employment of secondary reverse osmosis apparatus 40 may be predicated on the efficiency of absorber 20 and/or primary reverse osmosis apparatus 30. In this respect, the type of desiccant used, the rate of desiccant solution recirculation through absorber 20, contaminant level in the desiccant feed solution stream and/or the design specifications of reverse osmosis apparatus 30, 40 may influence the desirability of using secondary reverse osmosis apparatus 40.

In an embodiment, first reverse osmosis system 30 may produce an intermediate stream of desiccant solution that flows to the second reverse osmosis apparatus 40. The intermediate stream may have an intermediate concentration of desiccant that is greater than the concentration of desiccant in the desiccant solution entering the first reverse osmosis apparatus 30. The intermediate stream may flow into second reverse osmosis apparatus 40 through fluid connection 42. The desiccant solution flowing out of second reverse osmosis apparatus 40 may have a concentration of desiccant that is greater than the concentration of desiccant in the desiccant solution flowing into the first reverse osmosis apparatus 30 from absorber 20.

Additional reverse osmosis apparatus may be used as desired to perform the separation of desiccant from liquid water in sequential or parallel stages. For example, a third reverse osmosis apparatus 41 and respective fluid connections 43 are shown in phantom in FIGS. 1 & 2. Reverse osmosis systems or apparatus 30, 40, 41 may be commercially available ones such as suitably adapted FlowMAX reverse osmosis systems available from USFilter.

After entering primary reverse osmosis apparatus 30, none, all or a portion of the desiccant solution stream may be directed by control valve 31 to flow into secondary reverse osmosis apparatus 40 through connection 42. Control valve 31 may regulate the amount of flow between secondary reverse osmosis apparatus 40 and connection 48. The amount of desiccant solution flow from apparatus 30 to apparatus 40 may depend on the amount of desiccant concentration reduction within apparatus 30. Apparatus 30, 40 may produce a flow of recovered water 44 that may be used for various purposes such as within other systems of a power plant. A control valve 33 may regulate the amount of flow between apparatus 40 and apparatus 41.

A respective flow of strong desiccant solution may exit apparatus or systems 30, 40 into connection 48 that are pumped by a supply pump 50 to a heat exchanger or desiccant cooler 52. Cooler 52 may be connected to an outside heat sink or cooling source (not shown) for cooling the flow of strong desiccant solution to a desired temperature for optimizing absorption within absorber 20.

Figure 2:
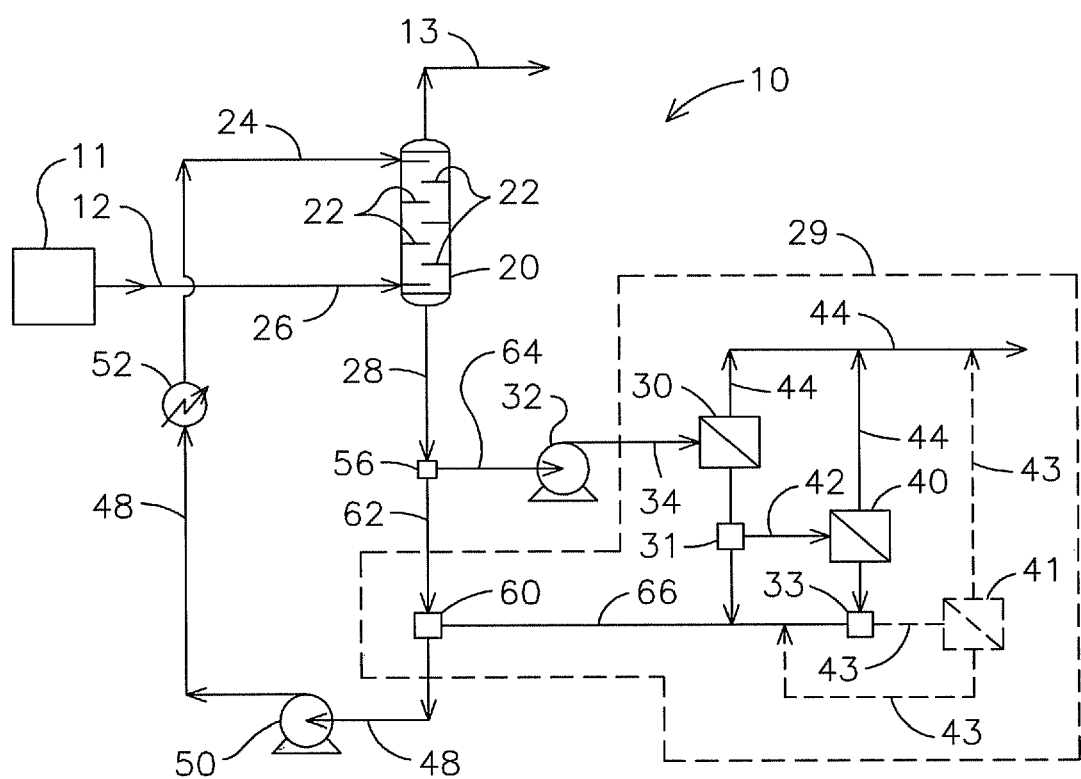
FIG. 2 is a schematic of another exemplary embodiment of the system of FIG. 1.

FIG. 2 illustrates an exemplary embodiment of system 10 with like components to those of FIG. 1 having like reference numerals. FIG. 2 illustrates that a weak desiccant solution flows out of absorber 20 through outlet connection 28 to control valve 56, which may be automatically or manually controlled to regulate the volume of desiccant solution flowing through system 10. For example, it may be desirable to allow all or a portion of the weak desiccant solution to bypass reverse osmosis circuit 29 and flow directly to a mixer or connector 60 through fluid connection 62. In this respect, fluid connections 28, 62, 48, 24 may constitute a main fluid connection between an outlet of absorber 20 and an inlet of the absorber 20.

Fluid connection 64 allows for a flow of desiccant solution to pass through pressurization pump 32 into reverse osmosis circuit 29. In this respect, it may be desirable to allow a portion of weak desiccant solution exiting absorber 20 to flow directly to mixer 60 so the weak desiccant solution mixes with a flow of strong desiccant solution flowing from reverse osmosis circuit 29 through fluid connection 66 to mixer 60. This allows for optimizing the desiccant concentration flowing through desiccant cooler 52 back to absorber 20 as a function of various operating parameters of a fossil fuel burning plant, system 10 and desiccant chemistry, for example.

Figure 3:
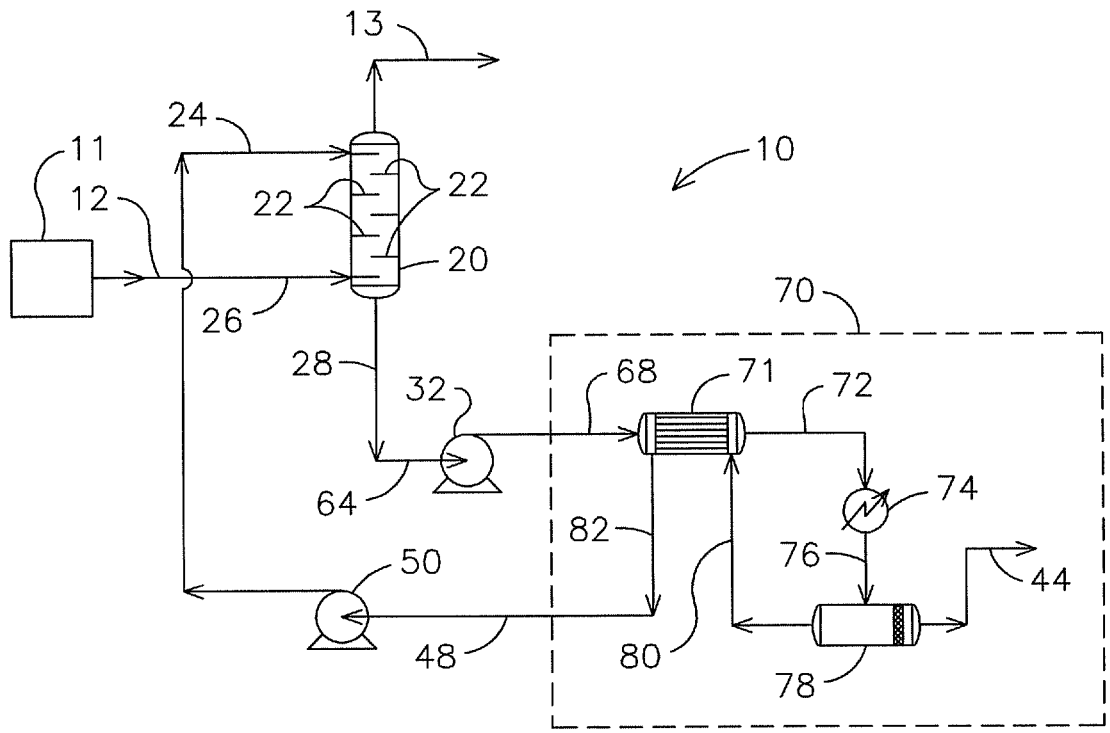
FIG. 3 is a schematic of an exemplary embodiment of a system for removing water from a flue gas and recovering water from a desiccant stream.

FIG. 3 illustrates an exemplary embodiment of system 10 with like components to those of FIG. 1 having like reference numerals. FIG. 3 illustrates that weak desiccant solution exiting absorber 20 may be pumped by a pressurization pump 32 through fluid connection 68 to a means for dehydrating the desiccant solution while maintaining the water in a liquid phase, such as a crystallization circuit 70. Crystallization circuit 70 may include a heat exchanger 71 that provides a first stage of cooling the flow of desiccant solution, which may then flow through fluid connection 72 to a desiccant crystallizer 74.

Figure 4:
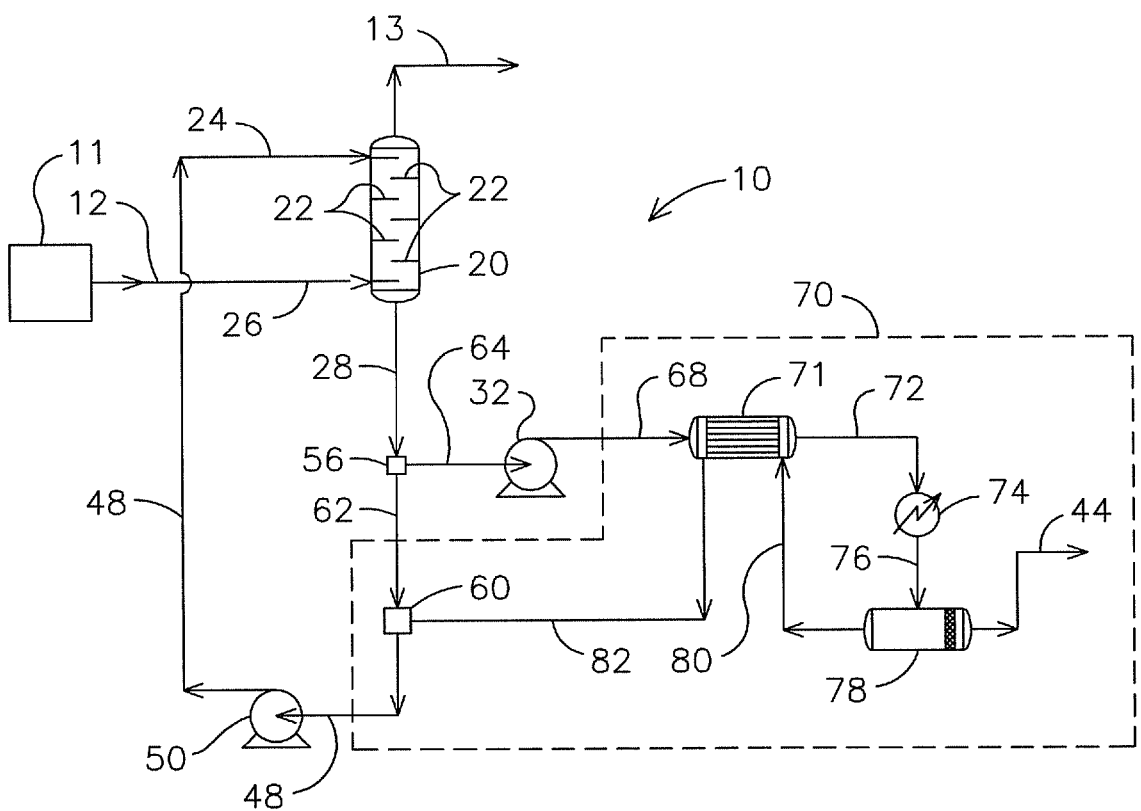
FIG. 4 is a schematic of another exemplary embodiment of the system of FIG. 3.

The desiccant solution entering crystallizer 74 may be supersaturated whereby the dissolved desiccant ions are susceptible to separation from water and forming crystals. Crystallizer 74 may be a heat exchanger having an outside heat sink or cooling source (not shown) sufficient to cause the concentration of desiccant in the desiccant solution to crystallize. In the embodiments of FIGS. 3 and 4, it is anticipated that crystallizer 74 will approach or achieve 100% crystallization of desiccant within the desiccant solution.

The crystallized desiccant solution may flow through fluid connection 76 to a liquid/solid separator 78. Separator 78 may comprise appropriate filters or be a centrifuge for separating the crystals from water as recognized by those skilled in the art. Separator 78 may include continuously or intermittently backwashed filters or centrifuges ("spinners") such as those employed in water treatment or salt production. Separator 78 produces a flow of recovered water 44 that may be pumped to other power plant systems as desired. Separator 78 may also produce a flow of crystallized desiccant solution or slurry containing a mixture of desiccant crystals and solution.

The flow of crystallized desiccant solution may flow from separator 78 through fluid connection 80 to heat exchanger 71 wherein the solution is reheated. Heat exchanger 71 may sufficiently reheat the crystallized desiccant solution to melt the crystals so that a strong desiccant solution flows from heat exchanger 71 through fluid connection 82. The strong desiccant solution may be directed to fluid connection 48 by valve or mixer 60 and pumped by pump 50 back to absorber 20. After dilution of the strong desiccant solution due to absorption of water in absorber 20, the solution exiting absorber 20 may be cooled as desired, upstream of crystallization circuit 70.

FIG. 4 illustrates an exemplary embodiment of system 10 with like components to those of FIG. 3 having like reference numerals. FIG. 4 illustrates that a weak desiccant solution flows out of absorber 20 through outlet connection 28 to control valve 56, which may be automatically or manually controlled to regulate the volume of desiccant solution flowing through system 10. For example, it may be desirable to allow all or a portion of the weak desiccant solution to bypass crystallization circuit 70 and flow directly to a mixer or connector 60 through fluid connection 62.

Fluid connection 64 allows for a flow of desiccant solution to pass through pressurization pump 32 into crystallization circuit 70. In this respect, it may be desirable to allow a portion of weak desiccant solution exiting absorber 20 to flow directly to mixer 60 so the weak desiccant solution mixes with a flow of strong desiccant solution flowing from crystallization circuit 70 through fluid connection 82 to mixer 60. This allows for optimizing the desiccant concentration flowing back to absorber 20.

It will be appreciated that the embodiments of FIGS. 3 and 4 illustrate a recuperative heat exchanger 71 within which the hotter, weak desiccant solution flowing into heat exchanger 71 from absorber 20 exchanges heat with the cooler, strong desiccant solution flowing into heat exchanger 71 from liquid/solid separator 78. Alternate embodiments allow for separate heat exchanging systems to be used to perform the cooling and heating of respective streams of weak and strong desiccant solution, respectively. Additional crystallizers 74 and separators 78 may be used to perform additional stages of cooling the desiccant solution and separating crystallized desiccant from water.

Figure 5:
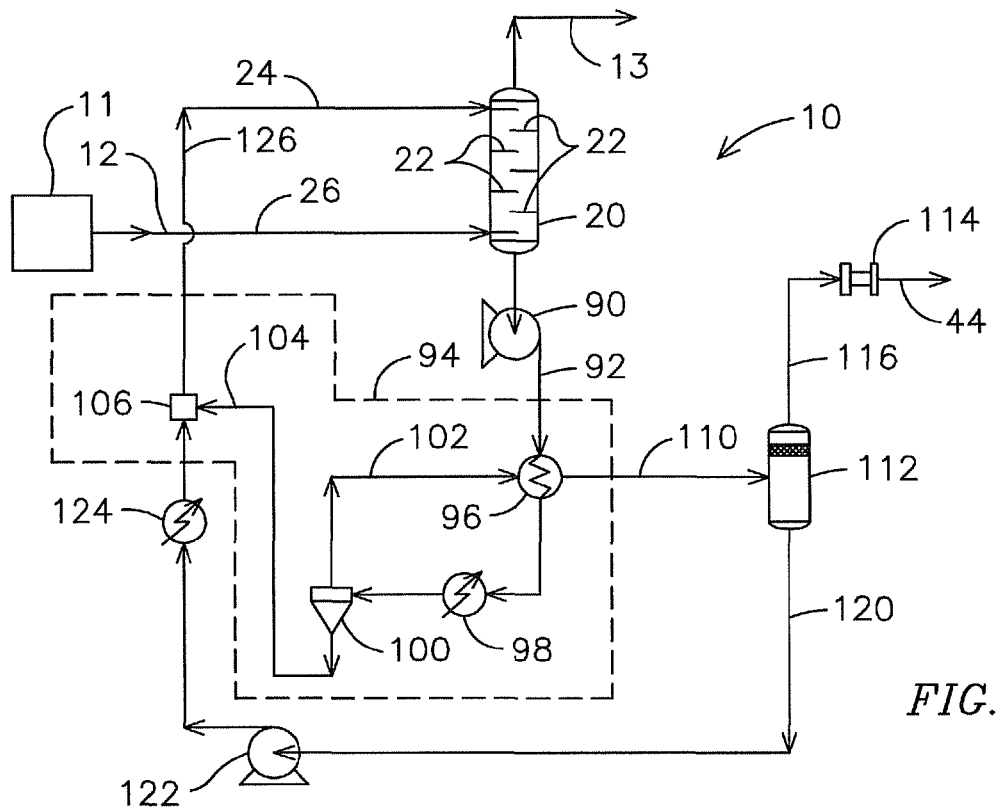
FIG. 5 is a schematic of an exemplary embodiment of a system for removing water from a flue gas and recovering water from a desiccant stream.

FIG. 5 illustrates an exemplary embodiment of system 10 with like components to those of FIG. 1 having like reference numerals. FIG. 5 illustrates that weak desiccant solution exiting absorber 20 may be pumped by a forwarding pump 90 through fluid connection 92 to a means for dehydrating the desiccant solution while maintaining the water in a liquid phase, such as a crystallization circuit 94. Crystallization circuit 94 performs a first stage of separation. In this respect, weak desiccant solution exiting absorber 20 passes through a heat exchanger 96, which may be a recuperative heat exchanger, and is cooled.

The desiccant solution then passes through a desiccant sub-cooler or heat exchanger 98 having an outside heat sink or cooling source (not shown), such as forced air cooling, local water sources or condensate from a power plant. Heat exchanger or desiccant sub-cooler 98 cools the desiccant solution sufficiently to cause at least a portion of the desiccant in the desiccant solution to crystallize. The temperature to which the desiccant solution is cooled by heat exchanger 98 may depend on the amount of water in the aqueous desiccant solution. It may be desirable to cool the desiccant solution as far as possible in heat exchanger 98 under ambient conditions to promote crystallization of the desiccant.

Figure 6:
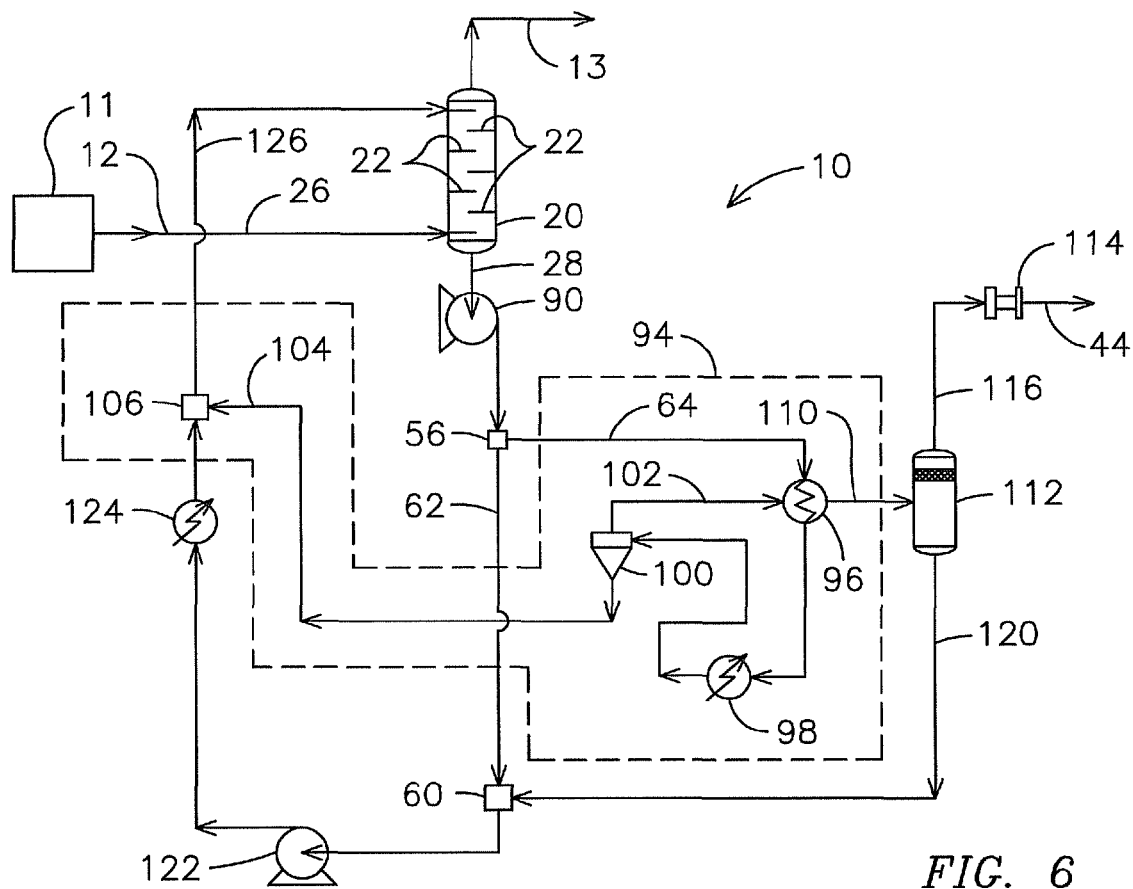
FIG. 6 is a schematic of another exemplary embodiment of the system of FIG. 5.

In the embodiments of FIGS. 5 and 6, it is anticipated that less than 100% of the desiccant within the desiccant solution will crystallize. In this respect, the desiccant solution may flow from heat exchanger 98 to a separator 100, which may be a cyclone separator for separating the fraction of crystallized desiccant from the desiccant solution. It will be appreciated that heat exchanger 98 and separator 100 may be one device that performs cooling and crystal separation. For example, a properly configured commercially available device referred to in the industry as a Spiractor® may be used depending on the kinetics of the desiccant crystal formation.

The affects of heat exchanger 98 and separator 100 are to produce separate streams of solution having different concentrations of desiccant. In this aspect, a first stream may be produced containing a relatively weaker concentration of desiccant and hence a higher vapor pressure. The first stream may exit separator 100 and flow through fluid connection 102 back to recuperative heat exchanger 96.

The first stream may flow through recuperative heat exchanger 96 where it may be further heated then pass through fluid connection 110 to a flash tank 112. Flash tank 112 performs a second stage of separation of water from desiccant. The attributes of the first stream, i.e., heated with a diluted concentration of desiccant, improve the ability of the water within the desiccant solution to flash within flash tank 112. A cooler-condenser 114 may be provided that is in fluid connection with flash tank 112 for condensing vapor from flash tank 112.

Under certain ambient conditions, such as during relatively low ambient temperatures, cooler-condenser 114 may be used advantageously to pull a low vacuum through fluid connection 116, which allows for pulling a high volume of steam off flash tank 112. This may increase the amount of recovered water 44 available for use in other parts of a power plant. It will be appreciated that flash tank 112 and cooler-condenser 114 may be operated at various pressures including sub-atmospheric and super-atmospheric.

A stream of strong desiccant solution may flow from flash tank 112 through fluid connection 120 and a mixer or connector 60 to a supply pump 122, which pumps the stream to a heat exchanger or desiccant cooler 124. Desiccant cooler 124 may have an outside heat sink or cooling source (not shown), such as forced air cooling, local water sources or condensate from a power plant. Desiccant cooler 124 cools the stream of strong desiccant solution sufficiently for mixing with the second stream of desiccant solution entering fluid connection 126 via connector 106 from separator 100.

The second stream of desiccant solution may be produced by separator 100 and contain a relatively higher concentration of desiccant, some of which may be crystallized. The second stream may be a two-phase flow, i.e., a desiccant rich slurry or concentrated brine containing crystallized desiccant and dissolved desiccant in solution. The mixed desiccant solutions then flow through fluid connection 24 into absorber 20. Crystallized desiccant within the mixed desiccant solution may be dissolved by heat within absorber 20 or by absorption of water within absorber 20.

FIG. 6 illustrates an exemplary embodiment of system 10 with like components to those of FIG. 5 having like reference numerals. FIG. 6 illustrates that a weak desiccant solution flows out of absorber 20 through outlet connection 28. The weak desiccant solution may be pumped by pump 90 to control valve 56, which may be controlled automatically or manually to regulate the volume of desiccant solution flowing through system 10. For example, it may be desirable to allow all or a portion of the weak desiccant solution to bypass crystallization circuit 94 and flow directly to a mixer or connector 60 through fluid connection 62.

Fluid connection 64 allows for a flow of desiccant solution to pass through into crystallization circuit 94. In this respect, it may be desirable to allow a portion of weak desiccant solution exiting absorber 20 to flow directly to mixer 60 so the weak desiccant solution mixes with strong desiccant solution exiting crystallization circuit 94 through fluid connection 120 to mixer 60. This allows for optimizing the desiccant concentration flowing to absorber 20, performance of crystallization circuit 94 and flashing within flash tank 112. It will be appreciated that the crystallization circuit 94 of FIG. 6 may operate the same as that of FIG. 5.

Alternate embodiments allow for independent heat exchangers to be used in lieu of a recuperative heat exchanger 96 and additional desiccant sub-coolers 98 and separators 100 may be used to perform additional stages of crystallizing the desiccant solution and separating crystallized desiccant from the desiccant solution. It will also be appreciated that embodiments of the invention may combine one or more reverse osmosis apparatus 30, 40 with the crystallization circuits 70, 94 to optimize the dehydration of desiccant solution and water recovery under different operating conditions of system 10.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A power plant comprising:
a combustion apparatus producing an exhaust gas;
an absorber receiving the exhaust gas, the absorber comprising a desiccant and producing a first stream of desiccant solution containing water and a first concentration of desiccant; and
a crystallizing heat exchanger for dehydrating the first stream of desiccant solution while maintaining the water in a liquid phase, the heat exchanger configured with an outside heat sink or cooling source that cools desiccant solution passing there through sufficiently to cause at least a portion of the desiccant in the desiccant solution to crystallize, the heat exchanger producing from the first stream of desiccant solution a second stream of desiccant solution comprising desiccant crystals and a second concentration of desiccant greater than the first concentration of desiccant; and
a separator receiving the second stream of desiccant solution and separating a quantity of the desiccant crystals from the second stream of desiccant solution, the separator producing a desiccant slurry containing the second concentration of desiccant.

2. The power plant of claim 1 further comprising a heat exchanger receiving and heating the desiccant slurry to melt at least a portion of the desiccant crystals.

3. The power plant of claim 1 further comprising:
a heat exchanger receiving and cooling the first stream of desiccant solution upstream of the crystallizing heat exchanger.

4. The power plant of claim 1 further comprising a flash tank receiving the second stream of desiccant solution from the crystallizing heat exchanger.

5. The power plant of claim 1, further including:
a desiccant sub-cooler receiving and further cooling the cooled first stream of desiccant solution to produce the second stream of desiccant solution comprising desiccant crystals; and wherein the separator receives the second stream of desiccant solution and separates a quantity of the desiccant crystals from the second stream of desiccant solution, the separator producing a slurry containing desiccant crystals and dissolved desiccant in solution, and a flow of desiccant solution containing a concentration of desiccant lower than a concentration of desiccant in the slurry.

6. The power plant of claim 5 further comprising a flash tank for receiving the flow of desiccant solution from the separator, the flash tank producing water vapor and a return stream of desiccant solution.

7. The power plant of claim 6 further comprising a return fluid connection for directing the return stream of desiccant from the flash tank to the absorber.

8. The power plant of claim 7 further comprising a desiccant cooler receiving the return stream of desiccant from the flash tank upstream of the absorber.

9. The power plant of claim 7 further comprising a fluid connection for directing the slurry to the return fluid connection upstream of the absorber.

10. A power plant comprising:
a combustion apparatus producing an exhaust gas;
an absorber receiving the exhaust gas, the absorber comprising a desiccant and producing a first stream of desiccant solution containing water and a first concentration of desiccant; and
a crystallization circuit receiving the first stream of desiccant solution and producing a second stream of desiccant solution having a second concentration of desiccant greater than the first concentration of desiccant and forming crystals of desiccant crystals therein.

11. The power plant of claim 10, the crystallization circuit comprising:
a recuperative heat exchanger receiving the first stream of desiccant solution; a desiccant crystallizer downstream of the recuperative heat exchanger receiving the first stream of desiccant solution from the recuperative heat exchanger, the desiccant crystallizer producing a stream of desiccant solution comprising desiccant crystals; and
a separator downstream of the desiccant crystallizer receiving the stream of desiccant solution comprising desiccant crystals and producing the second stream of desiccant solution.

12. The power plant of claim 11 further comprising the separator producing the second stream of desiccant solution and a stream of recovered water.

13. The power plant of claim 12 further comprising:
a fluid connection directing the second stream of desiccant solution from the separator to the recuperative heat exchanger; and
a fluid connection directing the second stream of desiccant solution from the recuperative heat exchanger to the absorber.

14. The power plant of claim 11 further comprising the separator producing a third stream of desiccant solution and the second stream of desiccant solution as a slurry containing desiccant crystals and dissolved desiccant in solution.

15. The power plant of claim 14 further comprising a flash tank for receiving the third stream of desiccant solution from the separator, the flash tank producing water vapor and a return stream of desiccant solution.

* * * * *